(12) United States Patent
Allen

(10) Patent No.: US 7,874,051 B2
(45) Date of Patent: Jan. 25, 2011

(54) EXTRACTOR TOOL FOR AN ULTRASONIC FLOW METER

(75) Inventor: Charles Robert Allen, Houston, TX (US)

(73) Assignee: Daniel Measurement and Control, Inc., Houston, TX (US)

( * ) Notice: Subject to any disclaimer, the term of this patent is extended or adjusted under 35 U.S.C. 154(b) by 615 days.

(21) Appl. No.: 11/837,605

(22) Filed: Aug. 13, 2007

(65) Prior Publication Data
US 2009/0044635 A1 Feb. 19, 2009

(51) Int. Cl.
*B25B 27/14* (2006.01)
(52) U.S. Cl. .................................. 29/281.1; 29/255
(58) Field of Classification Search ............... 29/281.1, 29/255–278
See application file for complete search history.

(56) References Cited

U.S. PATENT DOCUMENTS

| | | | | |
|---|---|---|---|---|
| 3,315,523 A * | 4/1967 | Conkling | ................. | 73/861.56 |
| 3,964,308 A | 6/1976 | Scarpa | | |
| 4,742,717 A | 5/1988 | Ichino | | |
| 4,911,018 A * | 3/1990 | Hartman | ................... | 73/861.12 |
| 5,745,968 A * | 5/1998 | Genest et al. | .................. | 29/270 |
| 5,860,203 A * | 1/1999 | Gehr, Jr. | ........................ | 29/252 |
| 5,887,328 A * | 3/1999 | Rydin et al. | ................... | 29/259 |
| 6,158,104 A * | 12/2000 | Roberts et al. | ................. | 29/446 |
| 6,415,491 B1 * | 7/2002 | Klann | ........................... | 29/259 |
| 6,598,489 B1 * | 7/2003 | Van Cleve et al. | ...... | 73/861.357 |
| 6,895,646 B1 * | 5/2005 | Houg | ........................... | 29/252 |
| 7,228,743 B2 * | 6/2007 | Weiss | ........................... | 73/732 |
| 2009/0044635 A1 * | 2/2009 | Allen | ........................ | 73/861.18 |

* cited by examiner

*Primary Examiner*—Lee D Wilson
(74) *Attorney, Agent, or Firm*—Conley Rose, P.C.

(57) ABSTRACT

An extractor tool for an ultrasonic flow meter is disclosed. Some system embodiments comprise a bracket configured to couple to a spoolpiece of an ultrasonic flow meter and a tube inserted through and coupled to the bracket. The tube is configured to seal to the spoolpiece and permit a transducer to be selectively installed and removed therethrough.

8 Claims, 6 Drawing Sheets

– 1 –

EXTRACTOR TOOL FOR AN ULTRASONIC FLOW METER

CROSS-REFERENCE TO RELATED APPLICATIONS

None.

STATEMENT REGARDING FEDERALLY SPONSORED RESEARCH OR DEVELOPMENT

Not applicable.

BACKGROUND

After hydrocarbons have been removed from the ground, the fluid stream (such as crude or natural gas) is transported from place to place via pipelines. It is desirable to know with accuracy the amount of fluid flowing in the stream, and particular accuracy is demanded when the fluid is changing hands, or "custody transfer." Even where custody transfer is not taking place, however, measurement accuracy is desirable.

Ultrasonic flow meters may be used in situations such as custody transfer. In an ultrasonic flow meter, ultrasonic signals are sent back and forth across the fluid stream to be measured. Data indicating various characteristics of the ultrasonic signals is transmitted by cables from transducers positioned within the body, or spoolpiece, of the ultrasonic flow meter to a location where a fluid flow may be calculated.

When maintenance, or replacement, of the transducer becomes necessary, it is often desirable to remove the transducer from the spoolpiece while the ultrasonic flow meter remains pressurized. Thus, extractor tools have been developed for this purpose. During the maintenance procedure, an extractor tool may be coupled to the exterior of the spoolpiece and the transducer subsequently removed. Because ultrasonic flow meters may be installed in harsh environments, any mechanism to reduce the time needed to perform such a maintenance procedure is desirable.

SUMMARY

The problems noted above are addressed, at least in part, by a system comprising an extractor tool adaptor for an ultrasonic flow meter. In some embodiments, the system comprises a bracket configured to couple to a spoolpiece of an ultrasonic flow meter and a tube inserted through and coupled to the bracket. The tube is configured to seal to the spoolpiece and permit a transducer to be selectively installed and removed therethrough.

In other embodiments, the system comprises a spoolpiece having an internal flow path and a transducer boss coupled to the spoolpiece. The transducer boss includes a face, an aperture located in the face, a first side wall, and a second side wall. The face comprises an outer surface of the spoolpiece. The first side wall is coupled to the face and has a first groove and a first recess in the first groove. The second side wall is coupled to the face and has a second groove.

Some method embodiments comprise inserting pads coupled to a bracket into two grooves located on a spoolpiece of an ultrasonic flow meter, positioning the pads over recesses located in the two grooves, and securing the bracket within the two grooves.

BRIEF DESCRIPTION OF THE DRAWINGS

For a more detailed description of the various embodiments, reference will now be made to the accompanying drawings, wherein.

NOTATION AND NOMENCLATURE

Certain terms are used throughout the following description and claims to refer to particular system components. This document does not intend to distinguish between components that differ in name but not function.

In the following discussion and in the claims, the teems "including" and "comprising" are used in an open-ended fashion, and thus should be interpreted to mean "including, but not limited to . . . ". Also, the term "couple" or "couples" is intended to mean either an indirect or direct connection. Therefore, if a first device couples to a second device, that connection may be through a direct connection, or through an indirect connection via other devices and connections.

DETAILED DESCRIPTION

Figure 1:
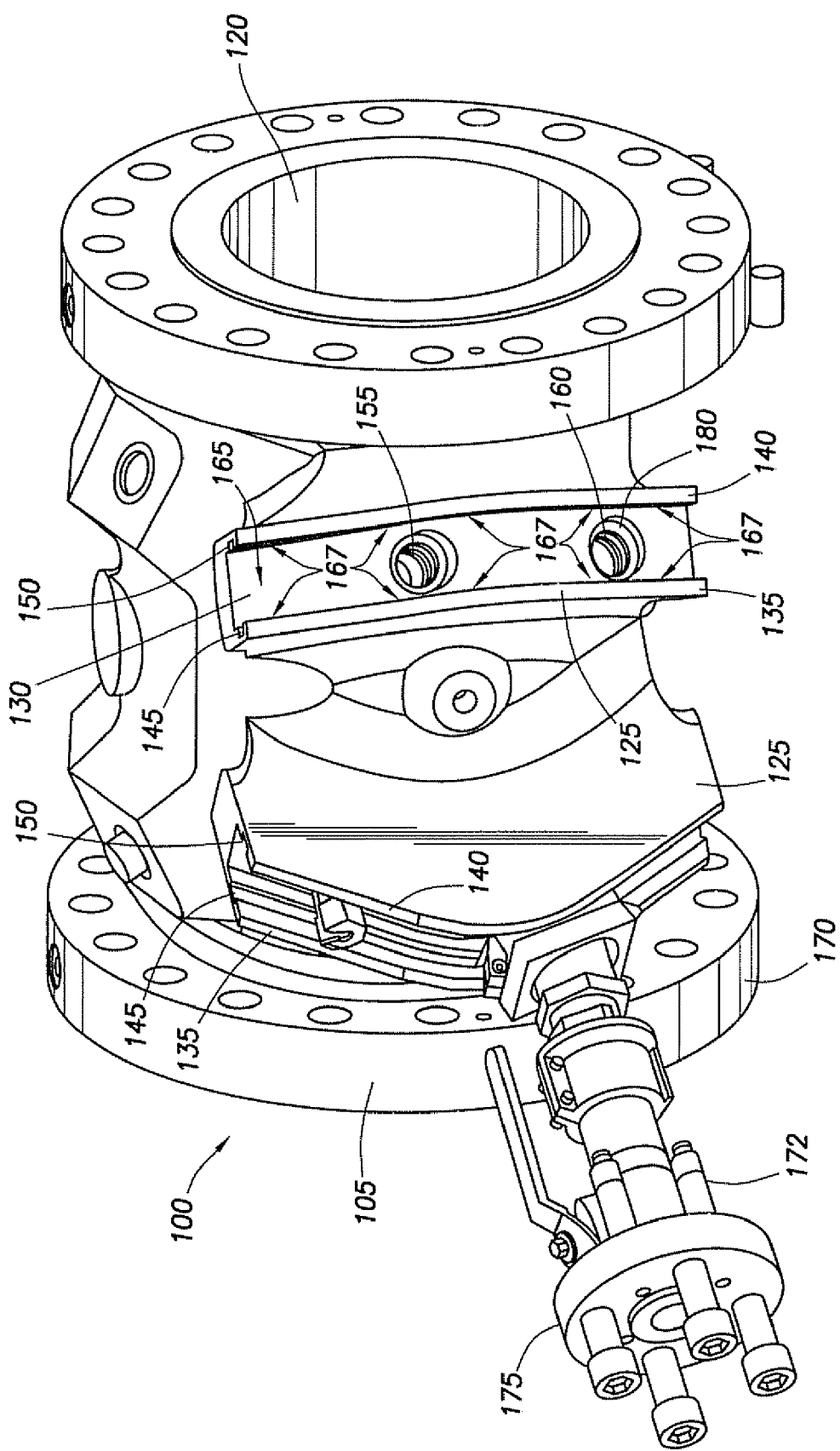
FIG. 1 is perspective view of an ultrasonic flow meter coupled to an extractor tool by an extractor tool adaptor in accordance with at least some embodiments.

FIG. 1 is a perspective of an ultrasonic flow meter coupled to an extractor tool by an extractor tool adaptor in accordance with at least some embodiments. In particular, ultrasonic flow meter 100 comprises spoolpiece 105 configured for placement between sections of a pipeline. Spoolpiece 105 comprises bore 120 therethrough, and in operation a fluid may flow through the bore 120. The flow meter 100 further comprises transducer bosses 125 located along its circumference. Although two transducer bosses 125 are shown, spoolpiece 105 may comprise as few as one or more than two transducer bosses 125.

Each transducer boss 125 further comprises face 130, sides 135, 140, side grooves 145, 150, and transducer ports 155, 160. Face 130 and sides 135, 140 form pocket 165 therebetween. Side groove 145 extends along the surface of side 135 bordering pocket 165. Side groove 145 comprises four recesses 167 at the base of side groove 145. Two recesses 167 straddle transducer port 155, while two recesses 167 straddle transducer port 160. Similarly, side groove 150 extends along the surface of side 140 bordering pocket 165. Side groove 150 comprises four recesses 167 at the base of side groove 150. Two recesses 167 straddle transducer port 155, while two recesses 167 straddle transducer port 160.

In some embodiments, spoolpiece 105 is a casting into which transducer bosses 125 are machined. Transducer ports 155, 160 and pocket 165 of transducer boss 125 are also created to the desired dimensions by the machining process. The depth of transducer ports 155, 160 to shoulder 180 provides a sealing diameter for an extractor tool adaptor. The width of face 130 of pocket 165 is greater than the diameter of transducer ports 155, 160. The depth of pocket 165 is sufficient to allow side grooves 145, 150 to be machined into sides 135, 140 of transducer boss 125 and recesses 167 to be machined into side grooves 145, 150 as well as pocket 165 itself. In some embodiments, side grooves 145, 150 are three-sided grooves with square corners. In other embodiments, side grooves 145, 150 may be half-dovetail grooves with only two sides, where the first side is parallel to face 130 of transducer boss 125 and the second side is oriented at angle less than 90 degrees from the first side. Moreover, in embodiments where side grooves 145, 150 are half-dovetail grooves, the angle of sides 135, 140 with respect to face 130 may be less than or greater than 90 degrees.

An extractor tool adaptor in accordance with various embodiments enables coupling of an extractor tool to an ultrasonic flow meter so that the extractor tool may remove a transducer while the ultrasonic flow meter remains pressurized. Still referring to FIG. 1, extractor tool 175 is coupled, at least in part, to ultrasonic flow meter 100 by extractor tool adaptor 170. In the illustration of FIG. 1, extractor tool 175 is positioned to remove a transducer from a transducer port in transducer boss 125 located to the left in this figure. To enable coupling of extractor tool 175 to ultrasonic flow meter 100 for the removal of the transducer, extractor tool adaptor 170 is coupled between extractor tool 175 and transducer boss 125 over the transducer port. Extractor tool adaptor 170 couples to transducers boss 125 by engaging side grooves 145, 150 of transducer boss 125, as described in more detail below.

In the embodiments exemplified by FIG. 1, the extractor tool 175 and extractor tool adaptor 170 are depicted as distinct components. In other embodiments, the extractor tool and the extractor tool adaptor may be integrated to form a single component, e.g. an integrated extractor tool, comprising a flange, valve, body, and the remaining extractor components.

Figure 2:
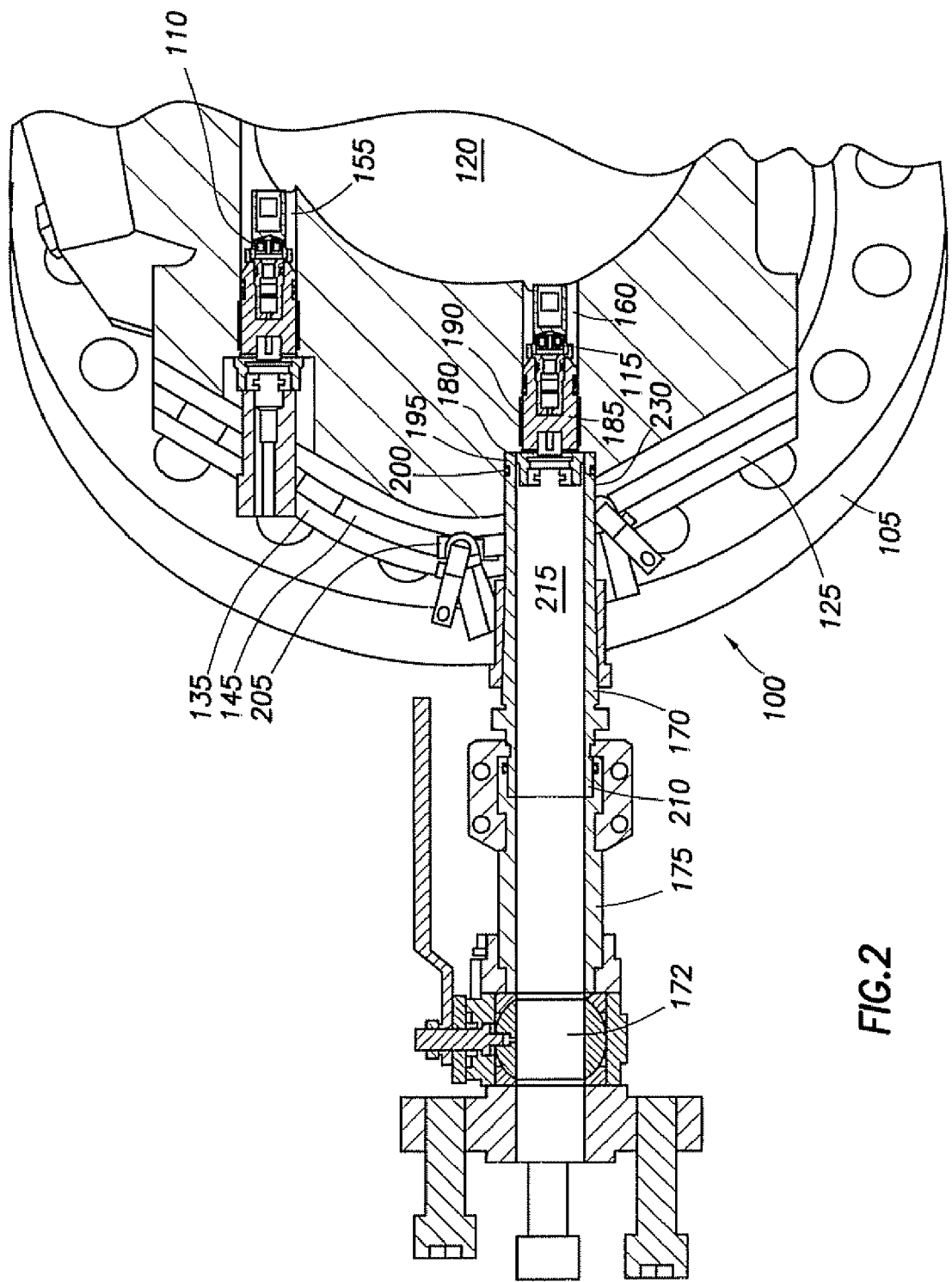
FIG. 2 is a cross-sectional view of the ultrasonic flow meter of FIG. 1, illustrating the engagement of the extractor tool to the meter spoolpiece.

FIG. 2 is a partial cross-sectional view of the ultrasonic flow meter of FIG. 1, illustrating the engagement of the extractor tool adaptor to the meter spoolpiece. As shown, transducer 115 is coupled to transducer housing 185, which is, in turn, coupled to the surface 190 of transducer port 160. In some embodiments, transducer housing 185 is threaded into transducer port 160. Thus, removal of transducer 115 may involve unthreading of transducer housing 185 from transducer port 160. Other mechanisms to couple transducer housing 185 to transducer port 160 may be equivalently used.

Extractor tool adaptor 170 engages ultrasonic flow meter 100 in two ways. First, end 195 of extractor tool adaptor 170 is inserted into transducer port 160 such that end 195 abuts shoulder 180 of transducer port 160. In some embodiments, extractor tool adaptor 170 further comprises a sealing element 200 (erg, an O-ring) at end 195. Second, extractor tool adaptor 170 further comprises pads 205 that interact with side grooves 145, 150 and engage recesses 167 of side grooves 145, 150 (described in more detail below).

Extractor tool 175 is coupled to the distal end 210 of extractor tool adaptor 170. The coupling of extractor tool 175 to extractor tool adaptor 170 at end 210 and the interface between proximal end 195 of extractor tool adaptor 170 and shoulder 180 of transducer port 160 provide chamber 215. Chamber 215 is selectively sealable to contain the pressurized fluid of ultrasonic flow meter 100 during removal of transducer 115 by operation of valve 172 of extractor tool 175.

Figure 3:
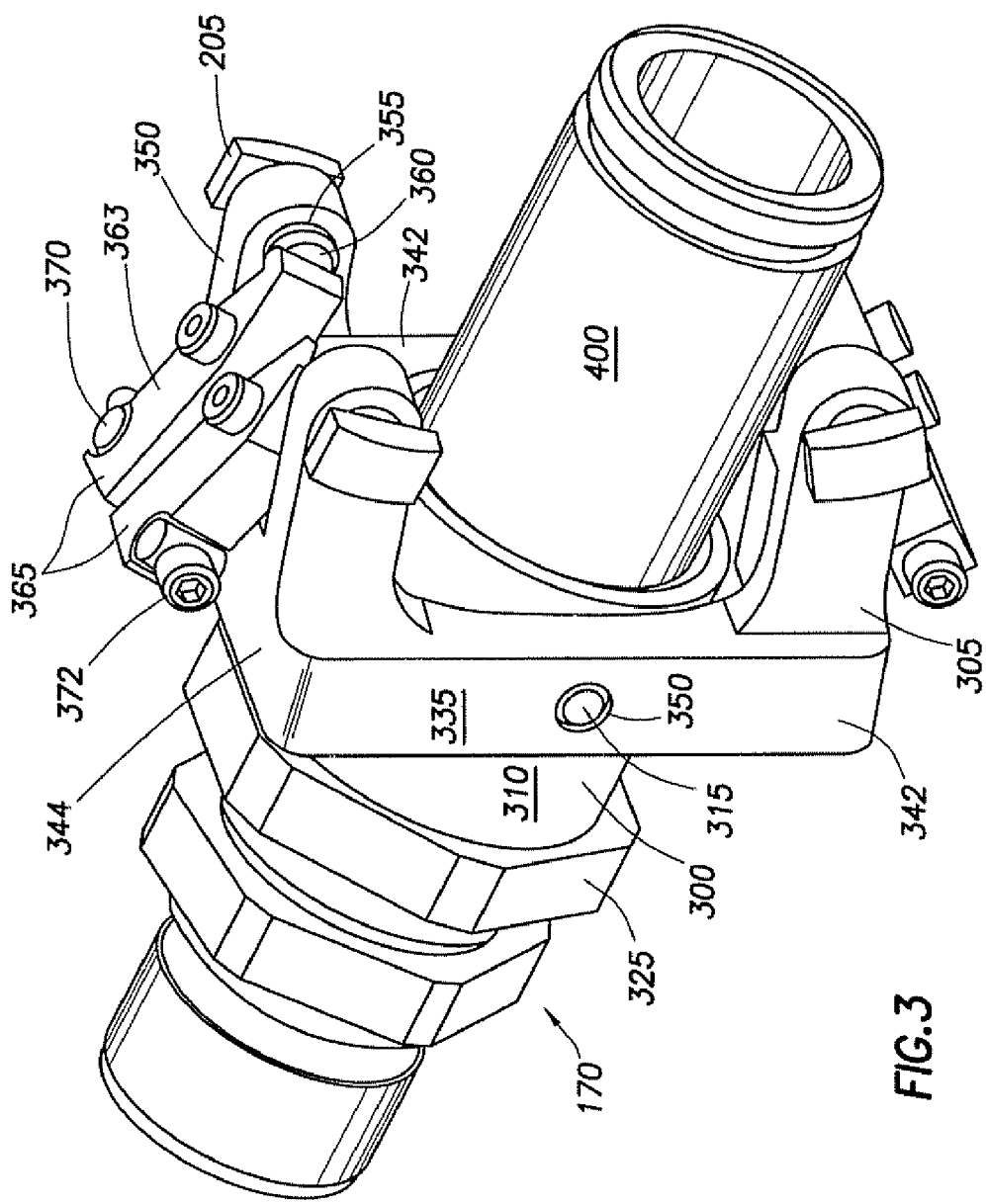
FIG. 3 is a perspective view of the extractor tool of FIGS. 1 and 2.

FIG. 3 is a perspective view of the extractor tool adaptor of FIGS. 1 and 2. Extractor tool adaptor 170 enables coupling of an extractor tool to an ultrasonic flow meter so that the extractor tool may remove a transducer from the meter Extractor tool adaptor 170 further comprises at least two components, an inner cylinder and an outer support member. As shown, inner cylinder 400 is inserted through outer support member 300 to form extractor tool adaptor 170. Outer support member 300 further comprises bracket 305, conduit 310, and two pins 315.

Figure 4:
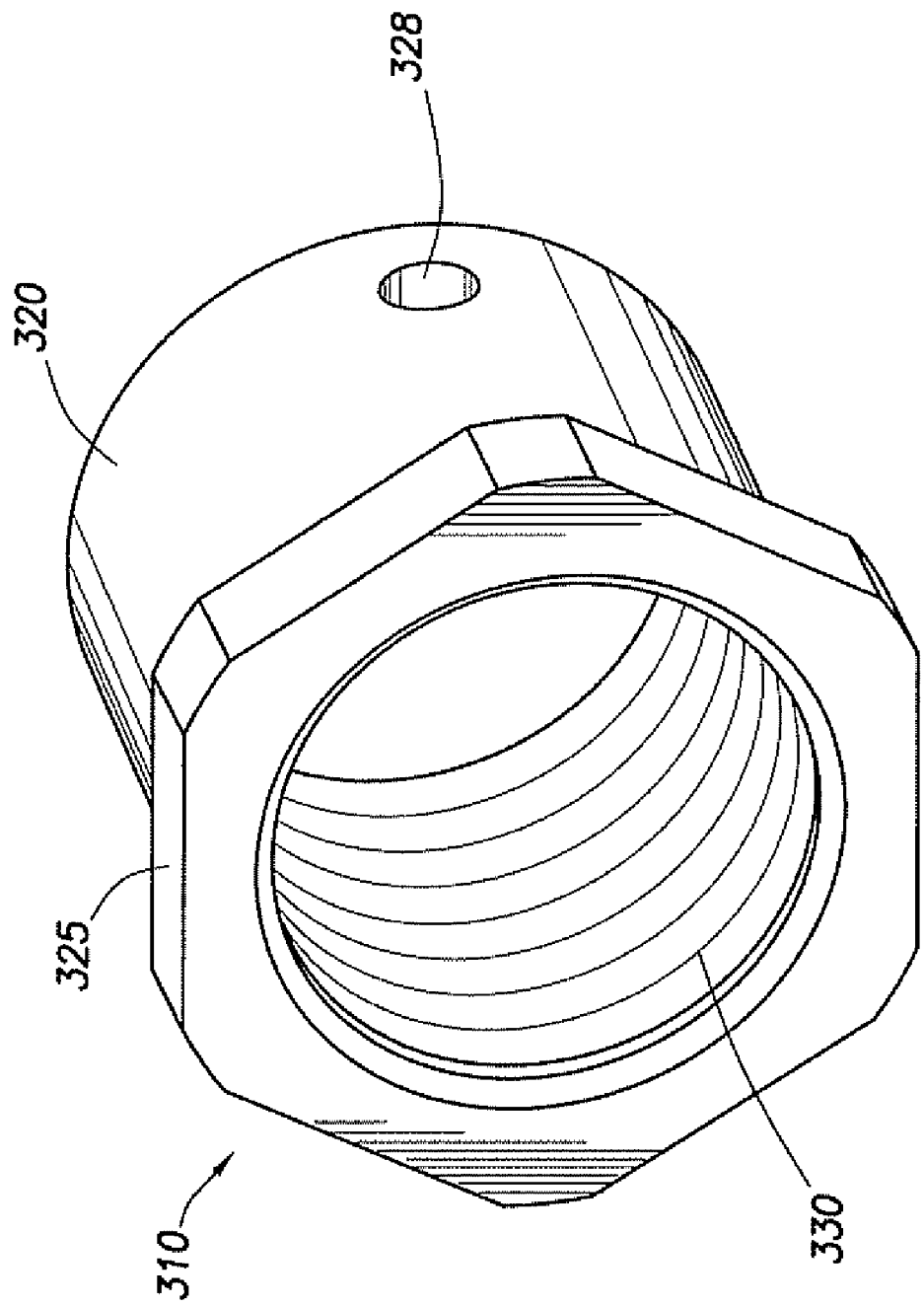
FIG. 4 is a perspective view of the conduit of the extractor tool of FIG. 3.

FIG. 4 is a perspective view of the outer support member conduit of FIG. 3. As shown, outer support member conduit 310 further comprises a hollow cylindrical body 320 with wrench flats 325 located along the body 320 circumference, two pin holes 328, and threads 330 located along the body 320 inner surface. Pin holes 328 are configured to receive pins 315 (shown in FIG. 3). Threads 330 permit conduit 310 to receive the inner cylinder of extractor tool adaptor 170, and to allow the relative position of the inner cylinder 400 (shown in FIG. 3) and the outer support member conduit 310 to be adjusted. In some embodiments, threads 330 are not perpendicular with respect to the inner surface of conduit 330, but rather are at an angle to provide a threaded hole that is horizontal and centered with the axis of transducer port 160. Thus, in such embodiments, the centerline of conduit 330 and the centerline of inner cylinder 400 are not coincident.

Referring again to FIG. 3, bracket 305 further comprises rectangular flame 335 having an illustrative four sides; two sides 342 and two sides 344. Each side 342 further comprises hole 350 through which pin 315 is inserted to engage pin holes 328 of conduit 310. The coupling of bracket 305 to conduit 310 by way of pins 315 enables conduit 310 to rotate within bracket 305 about pins 315.

Bracket 305 further comprises a pair of arms 350 extending from each side 344. At the end of each arm 350 is hole 355 therethrough. Pin 360 with pad 205 coupled thereto is inserted through each hole 355 of bracket arm 350. Between each pair of arms 350, there is positioned hinge 363. Each hinge 363 further comprises two arms 365 coupled by screw 372 and nut 370 such that tightening screw 372 into nut 370 spreads the portions of the arms 365 proximate to the pins 360, thereby causing arms 365 to push against pins 360. As arms 365 push against pins 360, each pin 360 translates within holes 355 in an outward direction, relative to bracket arms 350 Moreover, as pins 360 translate within holes 355 in an outward direction, pads 205 also displace outwardly.

During installation of extractor tool adaptor 170 on ultrasonic flow meter 100, bracket 305 is first coupled to spoolpiece 105 over transducer port 160. In particular, pads 205 of bracket 305 are inserted into side grooves 145, 150 of transducer boss 125. Bracket 305 may then be slid along side grooves 145, 150 until pads 205 of bracket 305 are proximate recesses 167 located in side grooves 145, 150 above and below transducer port 160. When pads 205 are proximate to recesses 167 straddling port 160, bracket 305 is positioned in the desired location over transducer port 160. To secure bracket 305 in this position, screw 372 is tightened into nut 370, causing arms 365 to spread. As arms 365 spread, arms 365 contact pins 360, pushing against pins 360 and causing pins 360 to translate outwardly within holes 355. As pins 360 translate within holes 355, pads 205 engage recesses 167, securing bracket 305 in place and preventing any further movement of bracket 305 within side grooves 145, 150.

Figure 5:
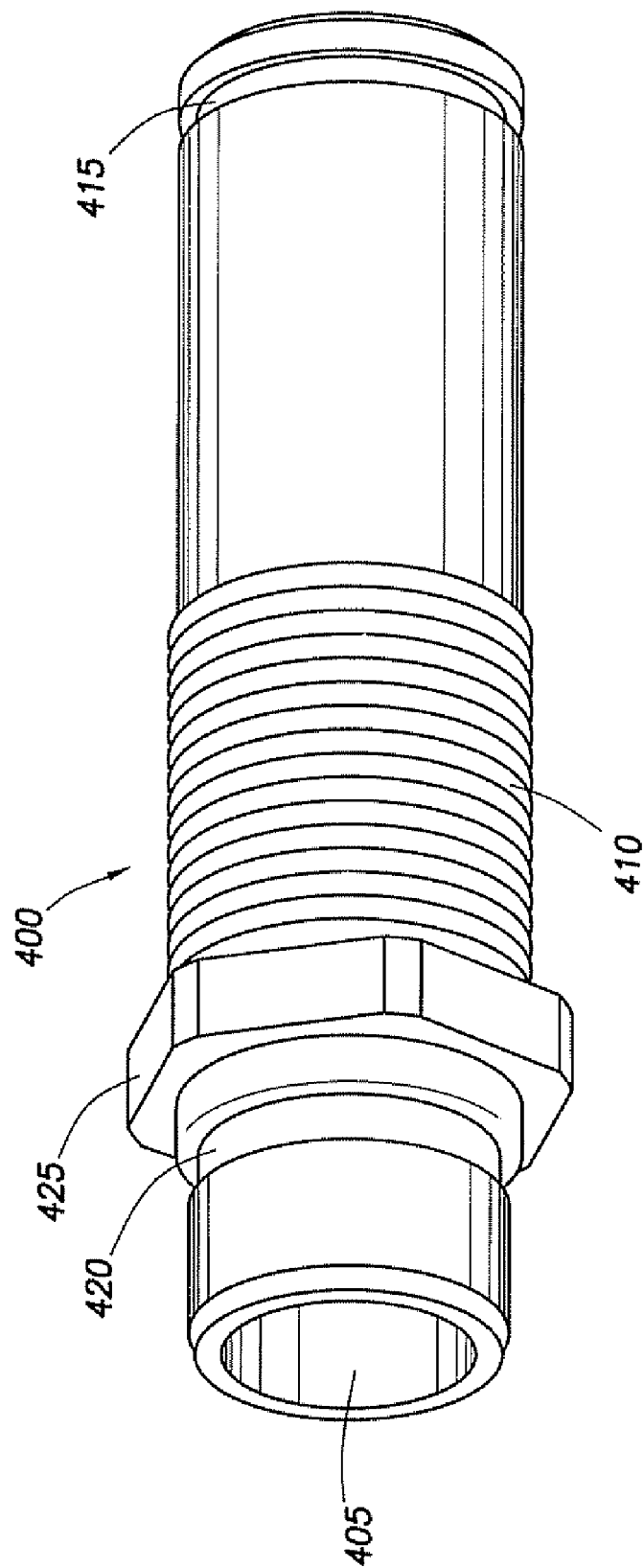
FIG. 5 is a perspective view of the inner cylinder of the extractor tool of FIG. 3.

FIG. 5 is a perspective view of the inner cylinder of the extractor tool of FIG. 3. Inner cylinder 400 further comprises throughbore 405, threads 410, sealing groove 415, engagement groove 420, and wrench flats 425. The wall thickness of inner cylinder 400 is sufficient to withstand the maximum working pressure of ultrasonic flow meter 100, the hydrostatic test pressure for extractor tool 175, and bending moments exerted by extractor tool 175 on extractor tool adaptor 170.

Throughbore 405 permits insertion of a rod, such as a rod telescoped within extractor tool 175 and extractor tool adaptor 170, to couple to transducer housing 185 and attached transducer 115. Throughbore 405 also permits extractor tool 175 to remove transducer housing 185 with transducer 115 from ultrasonic flow meter 100 through extractor tool adaptor 170. Sealing groove 415 accommodates sealing element 200. In some embodiments, sealing element 200 is an O-ring. When extractor tool adaptor 170 is coupled to ultrasonic flow meter 100, inner cylinder 400 abuts shoulder 180 (shown in FIG. 1) and sealing element 200 located in sealing groove 415 engages the surface 230 (shown in FIG. 2), thereby sealing chamber 215 of extractor tool adaptor 170 at end 195. Engagement groove 420 permits coupling of extractor tool 175 to extractor tool adaptor 170. Threads 410 of inner cylinder 400 engage threads 330 (shown in FIG. 4) of conduit 310 when inner cylinder 400 is inserted into outer support member 300.

Figure 6:
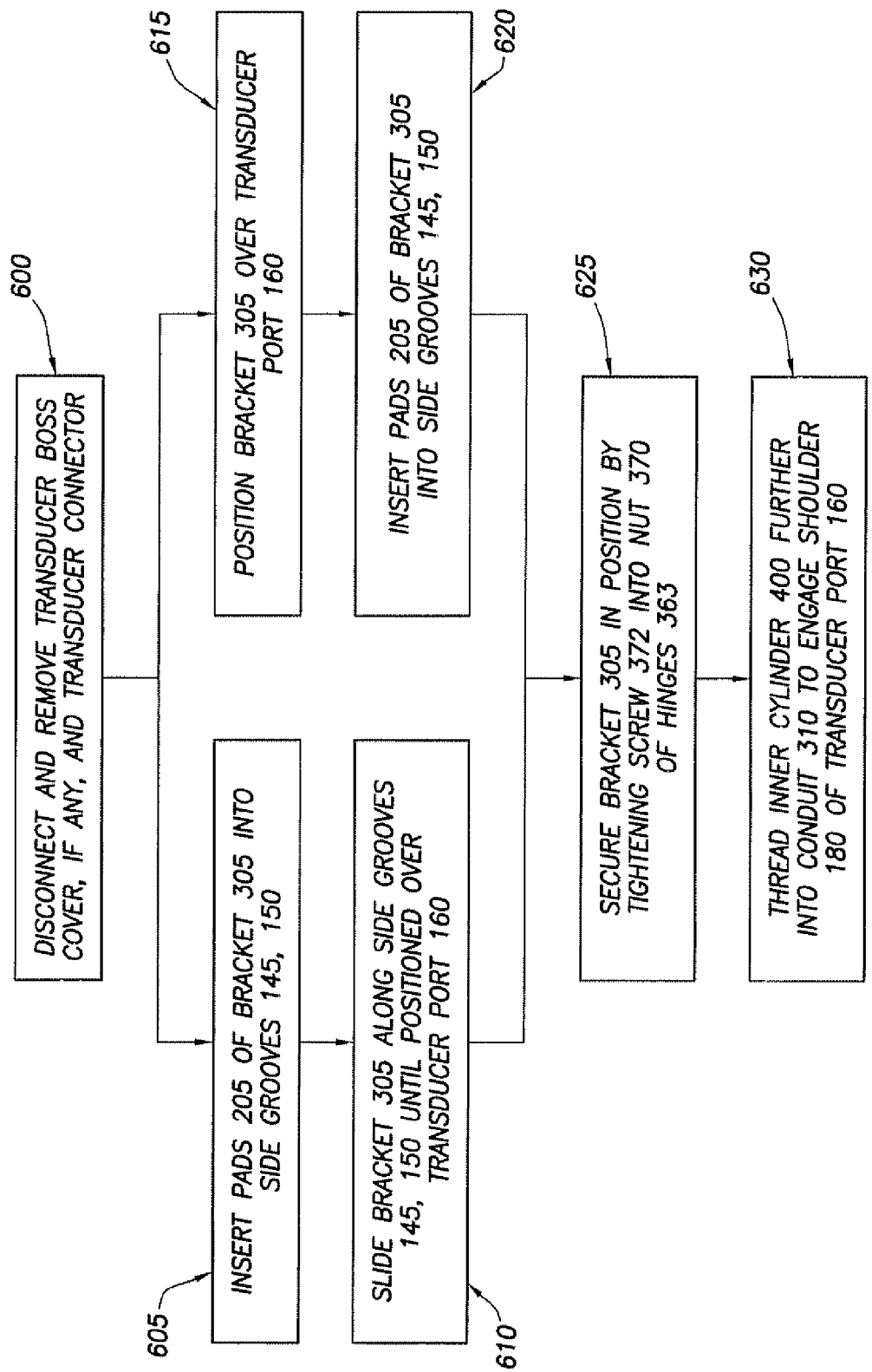
FIG. 6 illustrates various representative method embodiments for securing the extractor tool to the ultrasonic flow meter of FIG. 1.

FIG. 6 illustrates various method embodiments for installing extractor tool adaptor 170 on ultrasonic flow meter 100. These method embodiments begin when the cover over transducer boss 125, if any, and the transducer connector are disconnected and removed (block 600). Extractor tool adaptor 170 may then be coupled to ultrasonic flow meter 100, beginning with installation of bracket 305 of outer support member 300.

To install bracket 305, pads 205 of bracket 305 may be inserted into side grooves 145, 150 of transducer boss 125 (block 605). Bracket 305 may then be slid along side grooves 145, 150 until pads 205 of bracket 305 are proximate recesses 167 located in side grooves 145, 150 above and below transducer port 160 (block 610). Alternatively, bracket 305 may be positioned over transducer port 160 (block 615). Pads 205 may then be retracted by adjusting screw 372 to allow pads 205 to be inserted into side grooves 145, 150 proximate recesses 167 located in side grooves 145, 150 above and below transducer port 160 (block 620).

When pads 205 are proximate recesses 167 straddling port 160 (whether by sliding along the grooves 145 and 150, or by direct placement), bracket 305 is positioned in the desired location over transducer port 160. To secure bracket 305 in this position, screw 372 is tightened into nut 370, causing arms 365 to spread (block 625). As arms 365 spread, arms 365 contact pills 360, pushing against pins 360 and causing pins 360 to translate outwardly within holes 355. As pins 360 translate within holes 355, pads 205 engage recesses 167, securing bracket 305 in place and preventing any further movement of bracket 305 within side grooves 145, 150. This step completes coupling of outer support member 300 to ultrasonic flow meter 100.

Inner cylinder 400 may then be further threaded into conduit 310 of outer support member 300, causing end 195 of inner cylinder 400 to engage shoulder 180 of transducer boss 125 and sealing element 200 within sealing groove 415 of inner cylinder 400 to engage surface 230 of transducer boss 125 (block 630). This step completes coupling of extractor tool adaptor 170 to ultrasonic flow meter 100.

An extractor tool, for example, extractor tool 175, may then be coupled to extractor tool adaptor 170 and used to remove transducer 115 from ultrasonic flow meter 100. When such a maintenance procedure is completed, the extractor tool is decoupled from extractor tool adaptor 170. Extractor tool adaptor 170 may be decoupled from ultrasonic flow meter 100 following the methodology illustrated by FIG. 6, but in reverse order. After extractor tool adaptor 170 is removed, the transducer connector and transducer boss cover, if any, may be reconnected to ultrasonic flow meter 100

While various embodiments of this invention have been shown and described, modifications thereof can be made by one skilled in the art without departing from the spirit or teaching of this invention. The embodiments described herein are exemplary only and are not limiting. Accordingly, the scope of protection is not limited to the embodiments described herein, but is only limited by the claims which follow, the scope of which shall include all equivalents of the subject matter of the claims.

What is claimed is:

1. A system comprising:
    a bracket operable to connect with a spoolpiece of an ultrasonic flow meter and to disconnect from the spoolpiece, the bracket having a frame, a pair of arms extending from the frame, each arm having a pad coupled thereto, and an adjustable hinge coupled between the arms;
    a conduit extending through the bracket and pivotable relative to the bracket;
    an inner cylinder supported within the conduit, the inner cylinder having a throughbore extending between a first end and a second end, wherein the first end is adapted to sealingly engage the spoolpiece and the second end is adapted for coupling to a closeable valve, wherein the throughbore is isolated when the second end is coupled to the valve and the valve is closed.

2. The system of claim 1, wherein the inner cylinder further comprises:
    an annular groove proximate the first end; and
    a sealing element disposed within the groove.

3. The system of claim 1, wherein the inner cylinder further comprises:
    an annular groove proximate the second end, the annular groove adapted to receive a tool comprising the valve.

4. The system of claim 1, wherein the throughbore of the inner cylinder is configured to receive a tool for selectively installing a transducer within the spoolpiece and removing the transducer.

5. The system of claim 1, wherein the hinge is actuatable to spread the arms to engage the spoolpiece and to contract the arms to disengage the spoolpiece.

6. The system of claim 5, wherein the hinge further comprises:
    a screw extending through an end of each arm, the screw rotatable in a first direction to spread the arms and rotatable in a second direction opposite the first to contract the arms.

7. The system of claim 1, further comprising two pins, each pin extending between the bracket and the conduit, wherein the conduit is pivotable about the pins relative to the bracket.

8. The system of claim 7, wherein the inner cylinder threadably engages the conduit.

* * * * *